United States Patent Office 3,139,437
Patented June 30, 1964

3,139,437
NOVEL REACTION PRODUCTS OF POLYMERIC FAT ACIDS AND POLYAMINES
Lowell Peterson, Anoka, Minn., assignor to General Mills, Inc., a corporation of Delaware
No Drawing. Filed July 20, 1960, Ser. No. 43,990
4 Claims. (Cl. 260—309.6)

This invention relates to new and useful reaction products of polymeric fat acids and polyamines and their method of preparation. This is a continuation in part of U.S. application Serial No. 659,759 filed May 17, 1957, now Patent No. 3,002,941.

Polymeric fat acids and various polyamines have been employed in the preparation of polyamides. These polyamides vary in physical properties from hard solids to semi-liquids depending principally upon the type and amount of polyamine employed in their preparation.

Recent discoveries relating to the utilization of the semi-liquid polyamides containing reactive amino groups as co-reactants with various other polymeric materials greatly increased the demand for this type of product. For instance, when reacted with epoxy resins and/or various phenolic resins, the resulting products have many unique properties, especially in respect to impact resistance and flexural strength.

An object of this invention is to teach a reaction product of polymeric fat acids and polyamines which has an appreciably lower viscosity than heretofore available reaction products. A primary advantage to these products is that they materially reduce the viscosity of compositions containing other more viscous materials. For instance, when employed with epoxy resins bothersome diluents may be eliminated, epoxy resins of higher viscosity and molecular weight may be utilized in "100% solids" protective coating compositions and their useful applications are both aided and extended.

Another unexpected advantage to the reaction products of this invention is that they are lighter in color than the presently available reaction products of polymeric fat acids and polyamines.

A still further advantage to the products of this invention is in their use as a co-reactant with epoxy resins. When employed in this fashion the resulting product has a higher heat distortion temperature than the analogous product prepared from amino-polyamides derived from polymeric fat acids and polyamines.

Other objects and advantages to this invention will become apparent upon reading the subsequent specification.

The new and useful products of this invention may be prepared by reacting polymeric fat acids and polyamines at temperatures within the range of 285 to 315° C. for about two to four hours. These products are characterized by the fact that they contain a large percentage of imidazoline groups as compared to amide linkages. The products may be defined more specifically by the fact that they contain at least 2 imidazoline groups for every amide linkage. It will also be appreciated that the imidazoline nucleus,

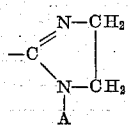

itself contains a reactive hydrogen or amine tail, such as —CH$_2$CH$_2$NH$_2$, at position A.

The "polymeric fat acids" employed in preparing the new reaction products are those resulting from the polymerization of drying or semi-drying oils, or their free acids or the simple aliphatic alcohol ester of these acids, particularly sources rich in linoleic acid. Suitable drying or semi-drying oils include soybean, linseed, tung, perilla, cottonseed, corn, sunflower, safflower, and dehydrated castor. Suitable fatty acids may also be obtained from tall oil, soapstock, and other similar material. In the polymerization process for the preparation of the polymeric fat acids the fatty acids with sufficient double bond functionality combine for the most part, probably by a Diels-Alder mechanism, to provide a mixture of dibasic and higher polymeric fat acids. These acids are often referred to as dimers, trimers, etc. In place of this method of polymerization, any other method of polymerization may be employed whether the resultant polymer possesses residual unsaturation or not. For example, mono- or polyene fat acids may be polymerized in the presence of ditertiary-butyl peroxide to yield polymeric fat acids useful in the present invention. The term "polymeric fat acids" as used herein is intended to include any individual polymerized fat acid as well as a polymerized mixture of acids, the latter usually containing a predominant portion of dimer acids, a small quantity of trimer and higher polymeric fat acids and some residual monomer.

While a variety of polymeric fat acids may be used, the most readily available source of such acids is through the polymerization of linoleic acid or linolenic acid rich materials. It should be appreciated that since linoleic acid occurs in nature as a complex mixture in every instance, it is available in various degrees of purity ranging from relatively expensive pure linoleic acid that has been laboriously purified to crude sources such as tall oil and soapstock which contain substances other than fatty acids. In actual practice linoleic acid rich mixtures of fatty acids are used to prepare the polymeric fat acids. One method of obtaining the linoleic acid rich fatty acids is by separating a major portion of the oleic and saturated fatty acids from any convenient and economical source of fatty acids having a high iodine value. In addition, polymeric fat acids are readily available commercial products. One such product is "EMPOL 1022" as sold by Emery Industries, Inc.

It has been postulated that the structural formula of the dimer acid from linoleic acid is as follows:

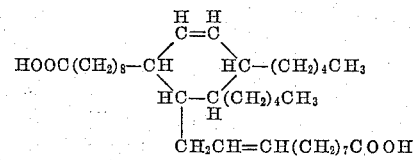

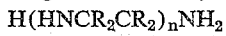

The trimer is then formed from the dimer by a Diels-Alder reaction with linoleic or linolenic acid at either of the double bonds shown in the above formula.

Polyamines useful in the practice of this invention may be illustrated by the general formula, $$H(HNCR_2CR_2)_nNH_2$$

where R is hydrogen or a lower alkyl radical containing less than 5 carbon atoms and n is an integer less than 6.

Illustrative polyamines are ethylenediamine (EDA), diethylene - triamine (DETA), triethylenetetramine (TETA), tetraethylenepentamine (TEPA), di-1,2-propanetriamine and the like.

The ratio of polymeric fat acids and polyamines which may be employed varies from 0.5 to 1.5 moles of polyamine per equivalent of acid and at least 1.5 amine equivalents per equivalent of acid.

This invention may be illustrated further by reference to the following examples in which all "parts" are expressed as parts by weight and all "percentages" are expressed as percent by weight, unless specified otherwise.

EXAMPLE I 1982 grams of polymeric fat acids containing a preponderance of di-linoleic acid and having a saponification equivalent of 284.5 were reacted with 1018 grams of triethylene tetramine as follows:

(1) The reactants were heated and stirred continuously in a five liter flask equipped with thermometer and distillation head.

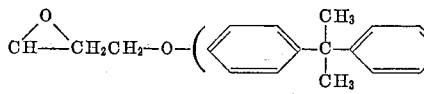

(2) At 160° C. water was evolved, and the reaction mixture was then raised to 300° C. over a 4 hour period.

(3) Reaction at 300° C. was continued for 2 hours at the end of which time a total of 246 gm. of distillate had been collected.

The resulting product had a Brookfield viscosity of 128 poises as measured on a #5 spindle at 10 r.p.m. and 24° C. Upon being reacted with an unmodified epoxy resin prepared by reacting Bisphenol A and epichlorohydrin and having an epoxy equivalency of about 200 in the ratio of 30 parts to 70 parts epoxy resin at 150° C. for 2 hours. The resulting casting had a heat distortion temperature of 96° C., a flexural modulus of $3.3 \times 10^5$ pound per square inch (p.s.i.) and an ultimate flexural strength of 13,000 p.s.i.

EXAMPLE II

Table I outlines the physical properties of the various reaction products of dimerized fatty acids and TEPA (tetraethylenepentamine) and their subsequent reaction with a commercially available epoxy resin. In each sample the reaction mixture contained one mole of TEPA (5.0 amine equivalents) per equivalent of acid. The reaction mixtures were held at the temperatures indicated for about 2 hours.

*Table I*

| Sample No. | Reaction Temp., °C. | Percent Imidazoline [1] | Brookfield Viscosity,[2] poises | Reaction Product: Epoxy [3] | Barcol Hardness | Heat Distortion Temp., degrees | Flexural Strength, p.s.i. |
|---|---|---|---|---|---|---|---|
| 1 | 250 | 41.7 | 675 | 25:75 | 55-59 | | |
| | | | | 30:70 | 57-62 | 62 | 10,000 |
| | | | | 35:65 | 55-61 | 59 | 9,400 |
| | | | | 40:60 | 54-57 | 51 | 8,500 |
| 2 | 280 | 60.8 | 565 | 25:75 | 57-61 | 54 | 6,300 |
| | | | | 30:70 | 61-65 | 64 | 8,900 |
| | | | | 35:65 | 62-64 | 67 | 5,000 |
| | | | | 40:60 | 58-62 | 64 | 10,000 |
| 3 | 300 | 70.5 | 285 | 25:75 | | 57 | 8,500 |
| | | | | 30:70 | | 72 | 8,900 |
| | | | | 35:65 | | 62 | 8,900 |
| | | | | 40:60 | | 56 | 8,000 |

[1] As determined by infrared analysis.
[2] Measured on a #5 spindle at 10 r.p.m. and 24° C.
[3] A reaction product of Bis-phenol A and epichlorohydrin having an epoxy equivalency of 185.

As is apparent from the examples, an excess of higher polyamine of from about 4.0 to 5.0 amine equivalents per equivalent of acid provides products of low viscosity on the order of about 100 to about 300 poises at 24° C.

As shown in the examples one of the principal uses contemplated for the reaction mixtures of this invention is as a co-reactant with epoxy resins. These resins are complex polymeric reaction products of polyhydric phenols with polyfunctional halohydrins and/or glycerol dichlorohydrin. The products thus obtained contain terminal epoxy groups. A large number of epoxy resins of this type are disclosed in Greenlee Patents 2,585,115 and 2,589,245. Several of these resins are readily available commercial products.

Typical polyhydric phenols useful in the preparation of epoxy resins include resorcinol and various bisphenols resulting from the condensation of phenol with aldehydes and ketones such as formaldehyde, acetaldehyde, acetone, methyl ethyl ketone and the like. A typical epoxy resin is the reaction product of epichlorohydrin and 2,2-bis(p-hydroxy phenyl) propane (Bisphenol A), the resin having the following structural formula,

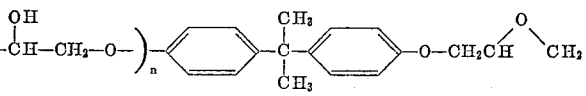

where $n$ is 0 or an integer up to 10. Generally speaking, $n$ will be no greater than 2 or 3 and is preferably 1 or less.

Epoxy resins may be characterized further by reference to their epoxy equivalent, the epoxy equivalent of pure epoxy resins being the mean molecular weight of the resin divided by the mean number of epoxy radicals per molecule, or in any case the number of grams of epoxy resin equivalent to one epoxy group or one gram-equivalent of epoxide.

Many modifications and variations of the invention as hereinbefore set forth may be made without departing from the spirit and scope thereof, and therefore only such limitations should be imposed as are indicated in the appended claims.

I therefore claim:

1. An amino-poly-imidazoline-amide prepared by reacting at temperatures in the range of 285–315° C. for about 2 hours polymeric fat acids and an excess of an aliphatic polyamine of the general formula $$H(NHCR_2CR_2)_nNH_2$$

where $n$ is an integer from 1 to 6 and R is selected from the group consisting of hydrogen and lower alkyl radicals containing less than 5 carbon atoms in which the ratio of reactants is at least 1.5 equivalents of amine for each equivalent of acid to about 5.0 equivalents of amine for each equivalent of acid and has an acid number less than 5, an amine number in the range of 270 to 500, a Brookfield viscosity of about 100 to about 300 at 24° C., and contains at least two imidazoline groups for every amide group.

2. An amino-poly-imidazoline-amide as defined in claim 1 in which said ratio of reactants is from about 4 to 5 equivalents of amine per equivalent of acid.

3. An amino-poly-imidazoline-amide prepared by reacting at temperatures in the range of 285–315° C. for a period of from 2 to 4 hours polymeric fat acids and an excess of an aliphatic polyamine of the general formula $H(NHCR_2CR_2)_nNH_2$ where $n$ is an integer from 1 to 6 and R is selected from the group consisting of hydrogen and lower alkyl radicals containing less than 5 carbon atoms in which the ratio of reactants is from about 4.0 to 5.0 equivalents of amine for each equivalent of acid and has an acid number less than 5, an amine value in the range of 270 to 500, a Brookfield viscosity of about 100 to about 300 at 24° C. and contains at least two imidazoline groups for every amide group.

4. An amino-poly-imidazoline-amide as defined in claim 3 in which said polyamine is triethylene tetramine.

References Cited in the file of this patent

UNITED STATES PATENTS

| | | |
|---|---|---|
| 2,324,491 | De Groote et al. | July 20, 1943 |
| 2,369,818 | De Groote et al. | Feb. 20, 1945 |
| 2,374,354 | Kaplan | Apr. 24, 1945 |
| 2,379,413 | Bradley | July 3, 1945 |
| 2,646,399 | Hughes | July 21, 1953 |
| 2,705,223 | Renfrew et al. | Mar. 29, 1955 |
| 2,781,352 | De Groote et al. | Feb. 12, 1957 |
| 2,839,549 | Wilson | June 17, 1958 |
| 2,867,592 | Morris et al. | Jan. 6, 1959 |
| 2,918,474 | Hughes | Dec. 22, 1959 |
| 2,940,927 | Hughes | June 14, 1960 |